Figure 1:
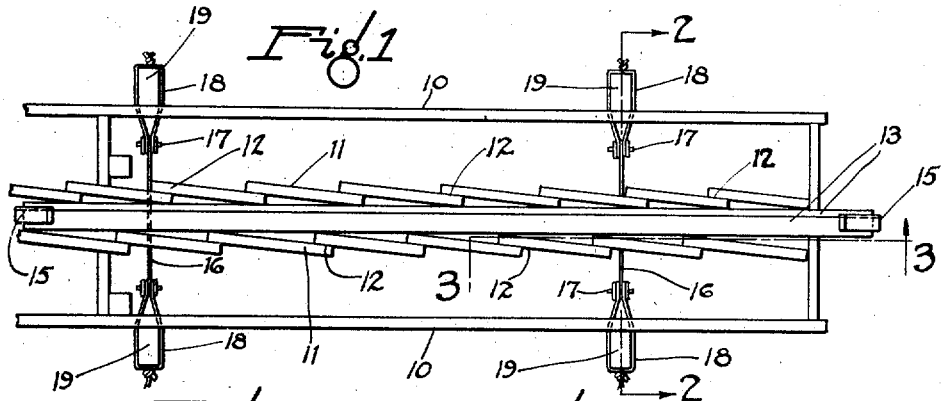

J. A. STUBKJARE AND H. L. RAIFF.

FORM FOR HOLLOW MOLDED WALLS.

APPLICATION FILED JAN. 17, 1921.

Reissued Apr. 4, 1922. 15,329.

Inventors
J. A. STUBKJARE and
H. L. RAIFF
By Paul Paul
ATTORNEYS

UNITED STATES PATENT OFFICE.

JOE A. STUBKJARE AND HARRY L. RAIFF, OF COLUMBUS, MONTANA, ASSIGNORS TO TUBULAR WALL COMPANY, OF BILLINGS, MONTANA, A CORPORATION OF MONTANA.

FORM FOR HOLLOW MOLDED WALLS.

15,329. Specification of Reissued Letters Patent. Reissued Apr. 4, 1922.

Original No. 1,314,099, dated August 26, 1919, Serial No. 270,349, filed January 9, 1919. Application for reissue filed January 17, 1921. Serial No. 438,006.

*To all whom it may concern:*

Be it known that we, JOE A. STUBKJARE and HARRY L. RAIFF, citizens of the United States, residing at Columbus, in the county of Yellowstone, State of Montana, have invented certain new and useful Improvements in Forms for Hollow Molded Walls; and we do hereby declare the following to be a full, clear, and exact description of the invention, such as will enable others skilled in the art to which it appertains to make and use the same.

This invention relates to new and useful improvements in molding forms and particularly to molding forms for use in constructing hollow concrete walls.

One object of the present invention is to provide a form which is easily placed in position to permit the pouring of the concrete thereinto and which may be easily and quickly removed after the concrete has set.

Another object is to provide a novel and improved means for spacing the inner portion of the form in proper relation.

A further object is to provide novel and improved means for retaining the external members of the form in proper position while molding the wall and which will serve, after the wall is finished, to space and brace the wall.

Other objects and advantages will be apparent from the following description when taken in connection with the accompanying drawing.

Figure 2:
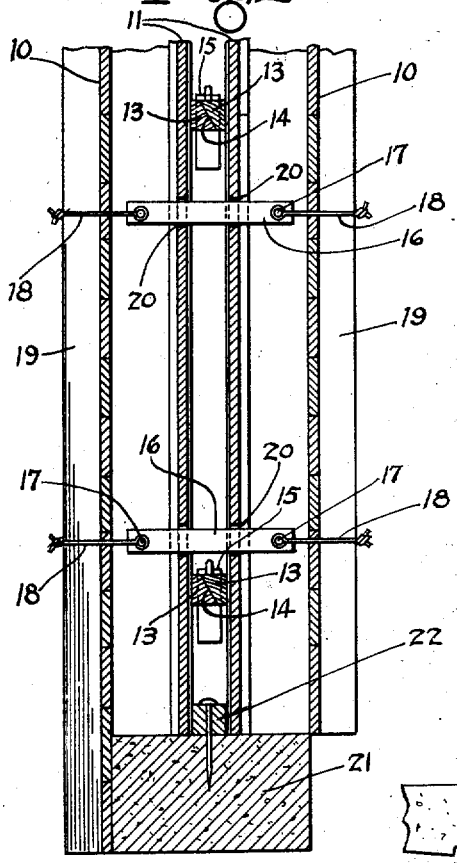
Figure 3:
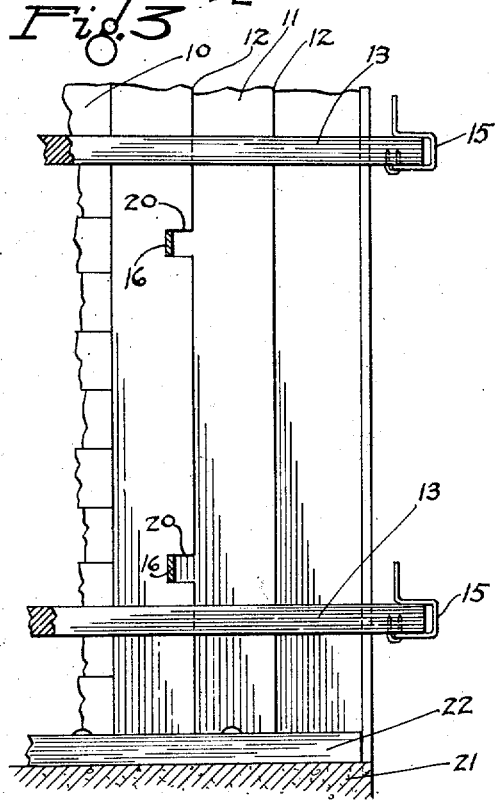
Figure 4:
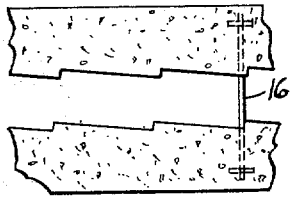

In the drawing:

Figure 1 is a top plan view of the improved hollow wall molding form in the position it assumes when the concrete is to be poured, Figure 2 is a vertical transverse sectional view taken on the line 2—2 of Figure 1, Figure 3 is a vertical longitudinal sectional view taken on the line 2—2 of Figure 1, Figure 4 is a top plan view of a fragment of the finished wall.

Referring particularly to the accompanying drawing, the mold includes the outer members 10 and the inner members 11, the latter of which are made up of the plurality of vertically disposed and jalousied strips which are secured together at their overlapping edges, as shown at 12.

Disposed horizontally between the two inner sections 11 of the form are the spacing members, which consists of the pairs of strips 13, having the longitudinally extending beveled abutting faces 14, which when properly adjusted, hold the strips in position to space the sections apart to the proper distance. Secured to each end of one of each of the pairs of beveled strips is an angularly U-shaped clip 15 which is adapted to be engaged in embracing relation with the ends of the separate pairs of strips to hold them in proper engaged relation.

It will be understood that the concrete is poured into the spaces between the inner and outer members, and not between the inner members, whereby a space will be formed between the members 11, when the wall is completed, which serves as an air space in the wall. When the concrete has properly set, the clips are released and the strips 13 separated and withdrawn from between the sections 11 of the form, when said inner sections may be moved toward each other and away from the wall faces molded thereby.

The lapped or jalousied feature of the boards 11 permits us to separate them easily, the edges of the boards sliding past each other and allowing the form to collapse with but little effort on the part of the user. This arrangement also allows the boards to swell when wet by the concrete without damage to the form, which usually would result if the boards were placed edge to edge in the same plane. Furthermore, the lapping edges of the boards provide tighter joints to prevent leakage of the liquid contents of the form than could possibly follow where the unfinished boards are placed edge to edge.

To hold the inner and outer portions of the wall from collapsing there are provided the spacing and tying members which consists of the strips of metal 16, each having a transverse headed pin 17 in each end, and to each of these pins is secured a wire 18, the other ends of the wires being passed between certain of the boards of the outer mold section 10 and secured to an upright 19 which is disposed against the outer face of said outer section. These strips 16 extend across the space in the center of the wall and have their ends embedded in the concrete which is molded between the inner and outer mold sections, and remain therein when the mold sections are taken down. In the overlapping edges of certain of the boards of the sections 11 there are formed the notches 20 in which are received the intermediate portions of the tying strips 16. These boards of the said mold sections are separated when the sections are taken out so that the said sections may be disengaged from the strips and thus permit the strips to remain embedded in the wall.

Before beginning the wall a foundation 21 is formed, and secured on the upper face of this foundation is the strip 22 which spaces the lower ends of the inner sections 11 apart, as clearly shown in Figure 2, and in Figure 3 of the drawing.

If desired, when the mold sections are taken down, the outer ends of the wires 18 may be left protruding from the faces of the wall for the purpose of attaching ornamentation thereto, or said wires may be twisted or tied together and then the surplus ends cut off.

When the molding operation has been completed, the inner mold section can be easily and quickly collapsed by moving the boards edgewise upon each other and thus freeing them from contact with the concrete surfaces, the strips interposed between the lapping boards having previously been removed.

What is claimed is:

1. A form for molding hollow concrete walls including a pair of outer spaced mold sections, a pair of inner mold sections spaced from the outer sections and from each other, each of the inner sections being formed of a series of vertical jalousied strips secured together at their overlapping edges, wall tying spacing members carried by and extending through the inner sections and horizontally disposed beveled strips extending between and holding the inner sections in spaced relation to each other.

2. A form for hollow molded walls including outer sections, inner sections spaced therefrom and from each other, means extending through the inner sections to tie the wall together and to be embedded in the wall, beveled abutting strips disposed horizontally between the inner sections and clips embracing the ends of the pairs of strips to hold them in proper position between the mold sections.

3. A mold for a hollow concrete wall including outer spaced mold sections, inner mold sections spaced from the first sections and from each other, said inner sections being formed with a series of vertical jalousied boards, certain of the boards having alining notches in their overlapping edges, tie strips extending through said notches and arranged to be embedded in the finished wall, flexible members secured to the ends of the tie members and extended through the outer mold sections, and vertical braces disposed against the outer faces of the outer mold sections and having the outer ends of the flexible members secured thereto.

4. A form for molding hollow concrete walls including a pair of outer spaced mold sections and a pair of inner spaced mold sections composed of a series of jalousied strips adapted to slide edgewise past each other to collapse the form.

5. A form for molding hollow concrete walls including a pair of outer spaced mold sections, a pair of inner mold sections spaced from the outer sections and from each other, each of the inner sections being formed of a series of vertical lapping strips.

6. A form for molding hollow concrete walls including a pair of outer spaced mold sections, a pair of inner mold sections spaced from the outer sections and from each other, each of the inner sections being formed of a series of vertical lapping strips, means for tying the sections together and horizontally disposed strips between the inner sections and having meeting faces for holding said sections in spaced relation.

7. A form for hollow molded walls including outer sections, inner sections spaced therefrom and from each other, means extending through the inner sections to tie the wall together and beveled abutting strips disposed horizontally between the inner sections.

8. A mold for hollow concrete walls including outer spaced mold sections, inner mold sections spaced from the first sections and from each other, said inner sections being formed with a series of vertical jalousied boards, certain of the boards having alining notches in their overlapping edges and tie strips extending through said notches and arranged to be embedded in the finished wall.

9. A mold for a hollow concrete wall including outer spaced mold sections, inner mold sections spaced from the first sections and from each other, said inner sections being formed with a series of vertical jalousied boards, certain of the boards having the aligning notches in their overlapping edges and tie strips extending through said notches and arranged to be embedded in the finished wall, and means secured to the ends of the tie members and extended through the outer mold sections.

10. A form for molding a hollow concrete wall including a pair of outer spaced mold sections, a pair of inner mold sections spaced from the outer sections and from each other, each of the inner sections being composed of a series of vertically arranged strips having disconnected lapping edges.

11. A form for molding hollow concrete walls including a pair of outer spaced mold sections, a pair of inner mold sections spaced from the outer sections and from each other, each of the inner sections being formed of a series of vertical strips having disconnected lapping edges, wall tying spacing members carried by and extending through the inner sections, and horizontally disposed strips extending between and holding the inner sections in spaced relation to each other.

12. A mold for hollow concrete walls including outer spaced mold sections, inner mold sections spaced from the first sections and from each other, said inner sections being formed with a series of vertical boards having disconnected lapping edges for relative movement to collapse the form, certain of the boards having notches in their edges and tie strips extending through said notches and arranged to be embedded in the finished wall.

JOE A. STUBKJARE.
HARRY L. RAIFF.

In presence of—
F. H. SWAN,
WM. DIAMOND.